FIG. III.
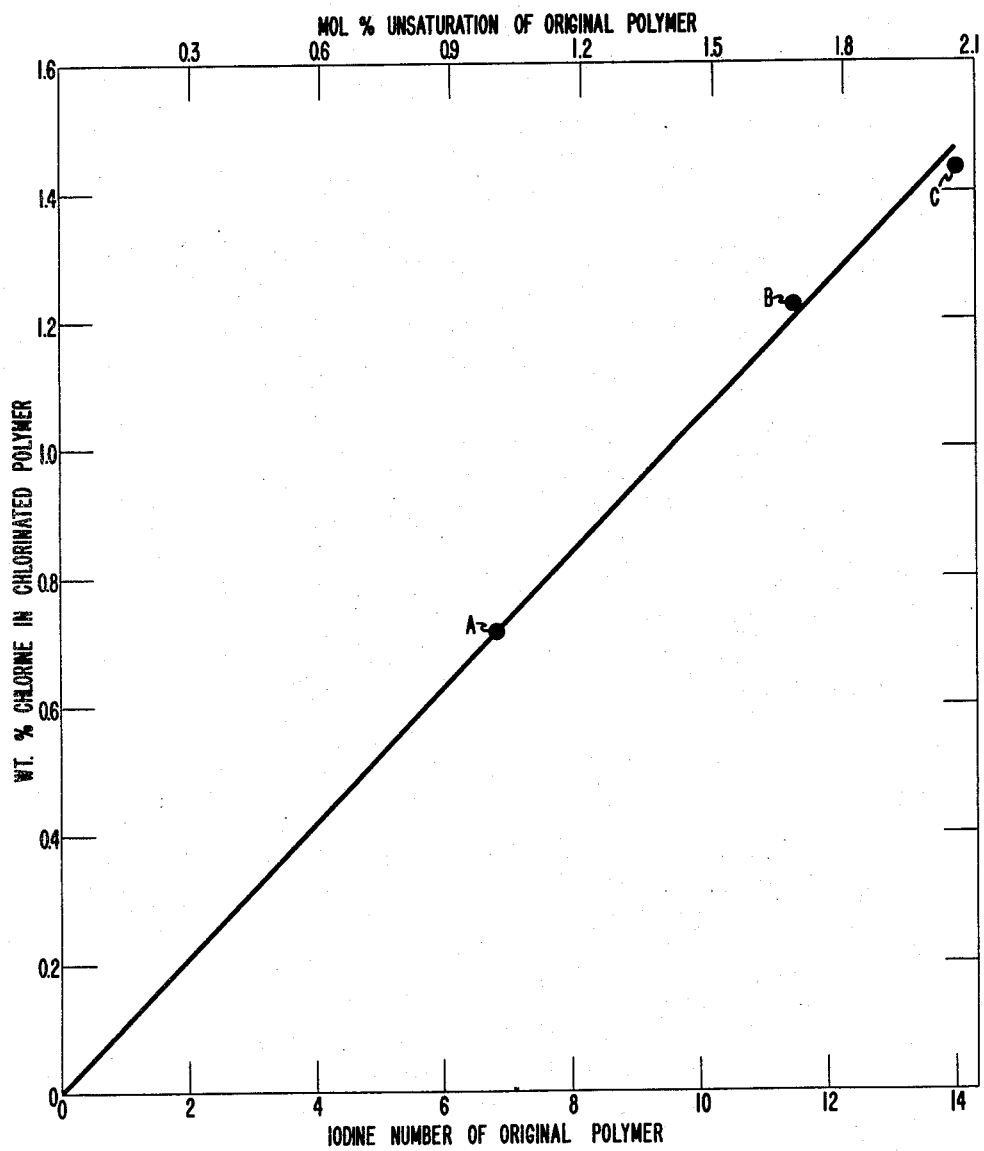

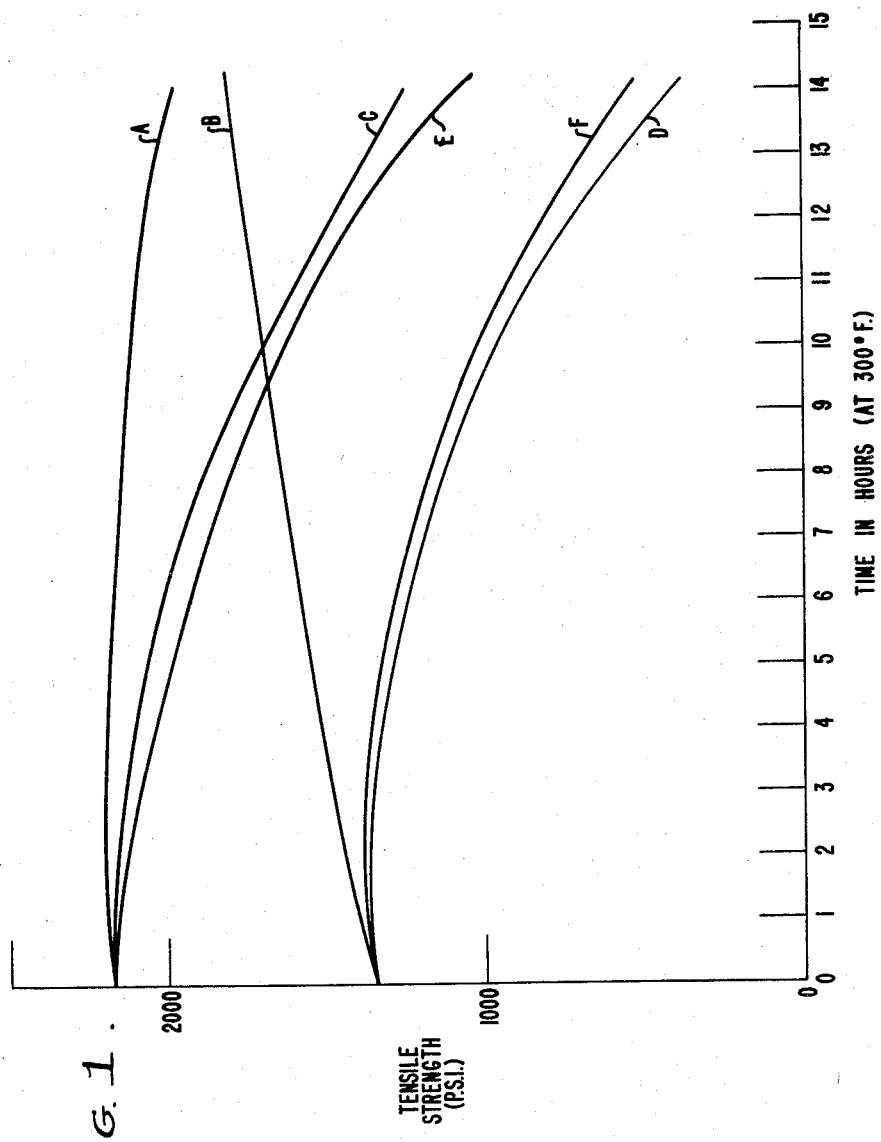

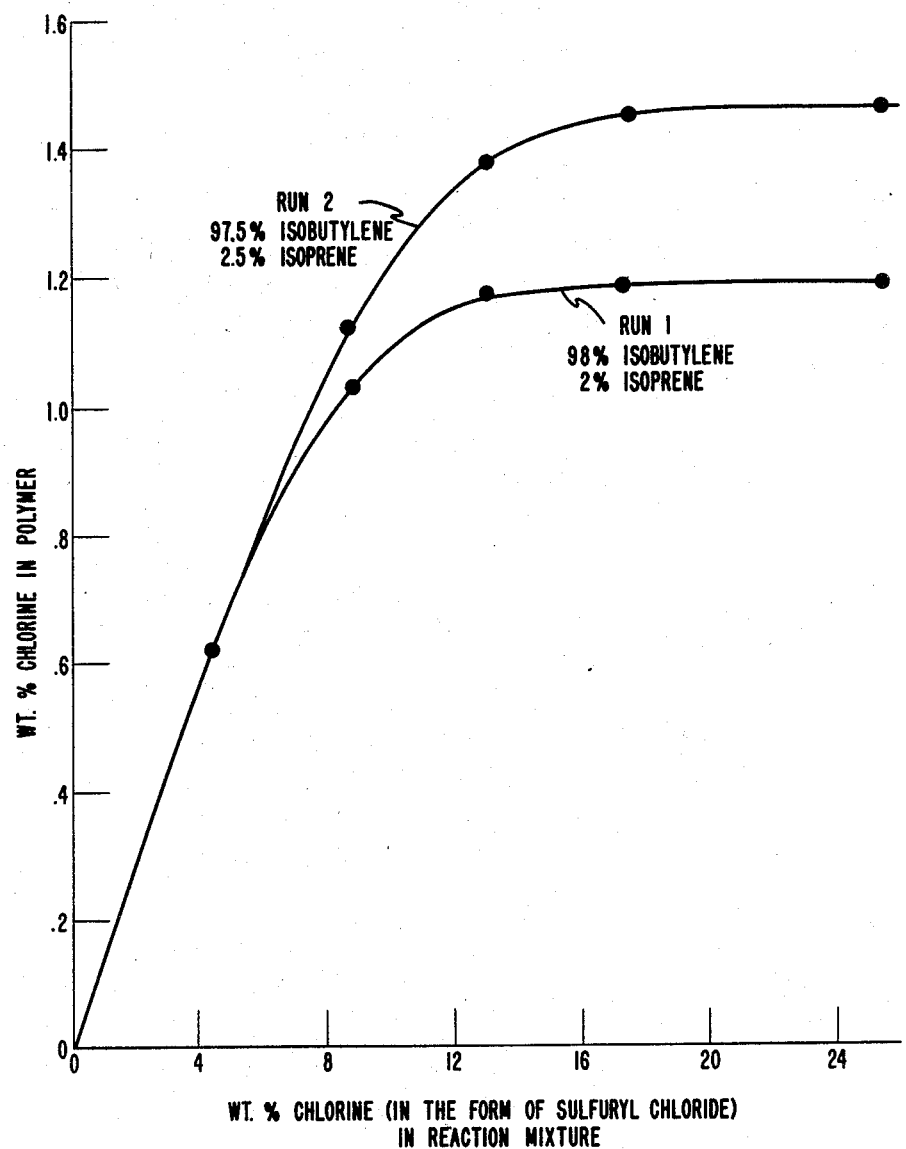

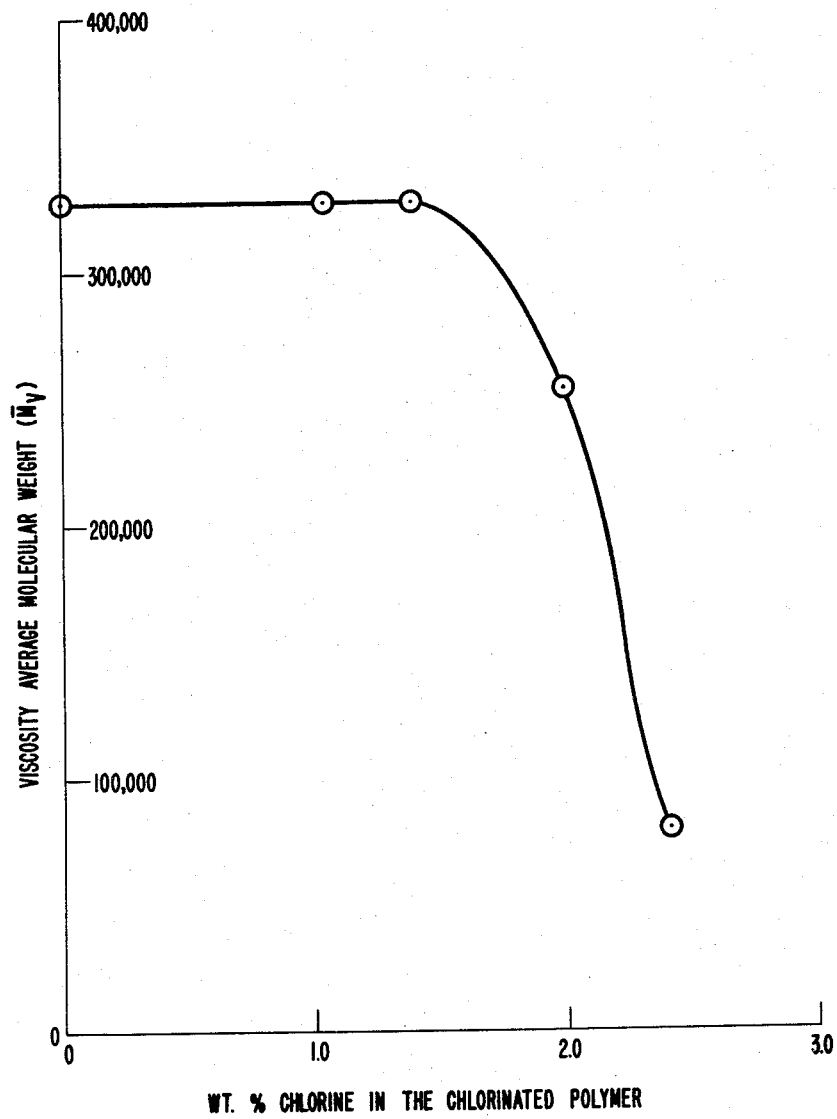

July 12, 1960    F. P. BALDWIN ET AL    2,944,578
PNEUMATIC TIRE
Filed May 31, 1955    5 Sheets-Sheet 5
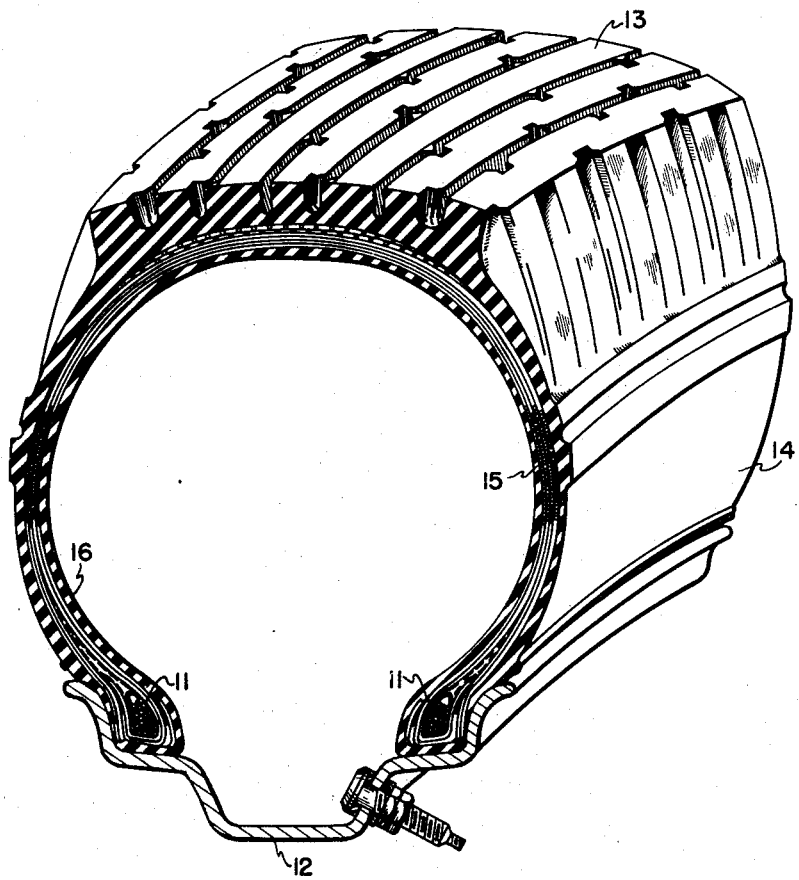
FIG.—V
Francis P. Baldwin
Robert M. Thomas    Inventors
By  W. H. Smyers    Attorney

United States Patent Office 2,944,578
Patented July 12, 1960

2,944,578

PNEUMATIC TIRE

Francis P. Baldwin, Colonia, and Robert M. Thomas, Westfield, N.J., assignors to Esso Research and Engineering Company, a corporation of Delaware Filed May 31, 1955, Ser. No. 512,182

24 Claims. (Cl. 152—330)

This invention relates to vulcanizable rubbery polymeric compositions which are chlorinated copolymers of iso-olefins and multi-olefins and to the preparation of such compositions. It also relates to compositions containing chlorinated copolymers of iso-olefins and multi-olefins together with other rubbery materials, such as synthetic and natural rubbers. The copolymers of the present invention generally contain a major proportion, preferably at least 70 weight percent of iso-olefins and a minor proportion, preferably not more than about 30 weight percent of multi-olefins.

Copolymers of the above general type, especially where the copolymer contains about 85–99.5% (preferably about 95–99.5%) of a $C_4$–$C_7$ iso-olefin such as isobutylene with about 15–0.5% (preferably about 5–0.5 weight percent) of a multi-olefin of about 4–14 carbon atoms are commonly referred to in patents and literature as "butyl rubber" or GR–I rubber (Government Rubber-Isobutylene) and, for example, is referred to as "butyl rubber" in patents and in the textbook "Synthetic Rubber" by G. S. Whitby (1954 Edition by John Wiley & Sons, Inc.), pages 608–609, etc. The expression "butyl rubber" as employed in the specification and claims is intended to include copolymers containing about 90–99% by weight of an iso-olefin of about 4–7 carbon atoms and about 10–1% of a conjugated multi-olefin of about 4–10 carbon atoms. The preparation of butyl-type rubbers is described in U.S. Patent 2,356,128 to Thomas et al. and also in other patents as well as in literature. In general, the rubber comprises the reaction product of a $C_4$–$C_7$ iso-olefin (preferably isobutylene) with a $C_4$–$C_{10}$ (preferably a $C_4$–$C_6$) conjugated diolefin such as isoprene, butadiene, dimethyl butadiene, piperylene, etc. The reaction product of isobutylene and isoprene is preferred.

Heretofore, it has not been possible to produce a butyl rubber which is curable with certain basic metal compounds such as bivalent metal oxides (preferably zinc oxide) in the absence of sulfur without producing a rubber which does not withstand heat aging and/or is degraded into polymers of undesirably low molecular weight. It has also not been possible to produce heat stable butyl rubbers (which are not degraded as to molecular weight) which are covulcanizable with certain other natural and synthetic rubbers, especially highly unsaturated rubbers.

Attempts have been made in the prior art to produce improved butyl rubbers by chlorinating the rubber so as to contain above about 25% chlorine and especially about 40–60% chlorine since it was believed that 25% chlorine absorption was undesirably low for physical strength. However, such attempts have resulted in badly degrading the molecular weight, viscosity and rubbery characteristics of the butyl rubber. Furthermore, when the butyl rubber is "saturated" with chlorine, as also proposed in the prior art, the molecular weight of the butyl rubber drops so badly that the "rubbery" characteristics are so seriously impaired that the material is not commercial. In fact, no chlorination procedures or procedures combining oxidation and chlorination as proposed in the prior art have produced a thermally stable, high molecular weight, rubbery polymer which is curable with zinc oxide and may in fact be covulcanized with other known rubbers, both natural and synthetic. Another proposal of the prior art has been to "brominate" the butyl rubber. However, no matter what quantities of bromine are introduced into the polymer, the heat aging resistance of the resulting butyl rubber leaves much to be desired.

By the present invention it is now possible to produce butyl type rubbers of excellent heat aging resistance. This is done by chlorinating the rubber in a manner which does not degrade the molecular weight thereof, but sufficiently to produce a rubber which retains its tensile strength upon heat aging. The chlorinated butyl rubbers of the present invention do not greatly differ in curing rate as compared to natural rubber and other synthetic rubbers such as GRS rubber and thus may be covulcanized therewith by the use of zinc oxide and/or sulfur or other known vulcanizing agents.

The invention will be demonstrated hereinafter with reference to the accompanying drawings in which:

Figure I is a graphical comparison showing the heat aging superiority of the chlorinated butyl rubber of the present invention as compared to brominated butyl rubber; the comparison being one of tensile strengths of the two respective rubbers heat aged at 300° F. for various time intervals up to 14 hours;

Figure II is a graph depicting the percent chlorine in two chlorinated butyl rubbers plotted against the percent chlorine in the reaction mixture in the form of sulfuryl chloride and is employed to demonstrate the special desirability of sulfuryl chloride as the chlorinating agent;

Figure III is a graph depicting a line of closest agreement for various butyl rubbers of isobutylene and isoprene as determined by plotting the iodine number and the mole percent unsaturation of the original polymer against the percent chlorine in the final chlorinated polymer and is for the purpose of showing that the relationship between the latter two is linear;

Figure IV is a graph depicting the effect of chlorination on the molecular weight of a butyl rubber containing 96.84 weight percent isobutylene and 3.16 weight percent isoprene; and Figure V is a cross-sectional view in perspective of a pneumatic tubeless tire employing therein the chlorinated butyl rubber of the present invention wherein the tire is depicted as being mounted on a conventional tire wheel rim.

According to the present invention, rubbery materials of the type of butyl rubber are chlorinated so as to contain about at least 0.5 weight percent (preferably at least about 1.0 weight percent) combined chlorine but not more than about "X" weight percent combined chlorine wherein:

$$X = \frac{35.46L}{(100-L)M_1 + L(M_2 + 35.46)} \times 100$$

and:

$L$ = mole percent of the multi-olefin in the polymer
$M_1$ = molecular weight of the iso-olefin
$M_2$ = molecular weight of the multi-olefin
35.46 = atomic weight of chlorine Restated, there should be at least about 0.5 weight percent of combined chlorine in the polymer but not more than about 1 atom of chlorine combined in the polymer per molecule of multi-olefin present therein; i.e. not more than about one atom of combined chlorine per double bond in the polymer. In other words, the maximum mole percent of combined chlorine should be about 0.25–0.60 times the mole percent unsaturation of the polymer.

Suitable chlorinating agents which may be employed are molecular chlorine, alkali metal hypochlorites (preferably sodium hypochlorite), sulfur chlorides (particularly oxygenated sulfur chlorides), pyridinium chloride perchloride, N-chlorosuccinimide, alpha-chloroacetoacetanilide, tri-chlorophenol chloride, N-chloroactamide, beta-chloro-methyl phthalimide, and other common chlorinating agents. The preferred chlorinating agents are molecular chlorine and even more especially sulfuryl chloride. The chlorination is advantageously conducted at 0° to 100° C. and preferably at about 20° to 80° C. for about one minute to several hours. However, the temperatures and times are regulated to chlorinate the rubbery copolymer to the extent abovementioned.

The chlorination may be accomplished in various ways. One process comprises preparing a solution of the copolymer as above, in a suitable inert liquid organic solvent such as an inert hydrocarbon or advantageously halogenated derivatives of saturated hydrocarbons, examples of which are hexane, heptane, naphtha, kerosene, straight run mineral spirits, benzene, toluene, naphthalene, chlorobenzene, chloroform, trichloroethane, carbon tetra chloride, etc., and adding thereto the chlorine or other chlorinating agent, preferably in solution, such as dissolved in an alkyl chloride, carbon tetra chloride, etc. Other variations, which are not as preferred, comprise employing the chlorinating agent in the form of a gas, and contacting the gas with either a solution of the copolymer or the solid copolymer per se. For example, if elemental chlorine is employed, it is most advantageously added in an alkyl chloride or carbon tetra chloride solution rather than in the gaseous state. The use of elevated or depressed pressures is optional since atmospheric pressure is satisfactory although the pressure may vary, depending upon the foregoing temperatures and times from about 1 to 400 p.s.i.a.

The copolymer to be chlorinated is advantageously first dissolved in a solvent such as any of the foregoing, especially a saturated hydrocarbon or a completely chlorinated hydrocarbon. Particularly preferred solvents for particular chlorinating agents are as follows: carbon tetra chloride and/or chloroform for molecular chlorine, paraffinic hydrocarbons and/or carbon tetra chloride and/or aromatics such as benzene as non-polar solvents for chlorination with certain chlorinating agents, especially sulfuryl chloride. However, any of the above-listed chlorinating agents may be employed with an inert polar solvent for the copolymers providing the conditions of chlorination and amounts of the chlorinating agent are carefully controlled.

In one process for the preparation of a butyl rubber which is to be chlorinated in accordance with the invention, a low molecular weight iso-olefin, preferably isobutylene, is reacted with a conjugated diolefin, preferably isoprene, at relatively low temperatures; preferably from about 0° C. to about —180° C. or lower; an advantageous range being from about —40° C. to about —160° C., preferably from about —80° C. to about —120° C. The reaction is conducted in the presence of a Friedel-Crafts catalyst such as aluminum chloride, titanium tetrachloride, boron trifluoride, uranium chloride, etc. dissolved in an alkyl halide, such as ethyl or methyl chloride, or dissolved in carbon disulfide or equivalent solvent. The resulting copolymer preferably has a Staudinger molecular weight between about 20,000 to about 100,000 or somewhat higher. This corresponds to a viscosity average molecular weight of about 150,000 to about one million. The preferred viscosity average molecular weight is from about 250,000 to about 1,000,000 or more. When so prepared, the material is rubbery in nature, has the property of being curable with sulfur especially in the presence of alkylated tellurium thiocarbamates, such as tellurium diethyl dithiocarbamate, or in the presence of organic sulfides, particularly of the tetra alkyl thiuram sulfide type, etc.

Butyl rubber compositions may also be prepared wherein the cure is effected in the presence of such materials as p-dinitrosobenzene, p-quinone dioxime, etc, and their various homologs and derivatives known for this purpose. The cure may also be accomplished in the presence of such compositions as (1) sulfur and a zinc dialkyl polythiocarbamate (2) sulfur, lead oxide, and p-quinone dioxime (3) sulfur, benzothiazyl sulfide and p-quinone dioxime, (4) p-quinone dioxime dibenzoate, lead oxides and sulfur, (5) selenium and/or tellurium containing compositions, etc.

The copolymer, which has been cured has good elastic limit, tensile strength, abrasion resistance and flexure resistance. The copolymer has a mole percent unsaturation of about 0.5 to about 25–35, preferably between about 0.5–10.0. As well as the above, the copolymer before curing may be further compounded with various fillers, pigments, plasticizers, and anti-oxidants, etc. Also, the use of other activators, vulcanization accelerators, curing agents, etc. for special applications for butyl-type rubbers is known in the art and disclosed in various patents and publications. Therefore, the particular compounding disclosed in the specific examples herein is to be construed as merely representaive or illustrative, is not intended to be all-inclusive, and in many instances certain of the materials may be omitted and other materials added without departing from the essence of the instant invention.

The vulcanization of chlorinated butyl rubber or co-vulcanization of chlorinated butyl-type rubber with other rubbery materials according to the instant invention may be from about 250° F. to about 450° F., preferably at about 280°–350° F. for from several seconds up to about 5 hours or more. Normally the vulcanization or co-vulcanization is from about 10 minutes to about 2 hours at about 280° F. to about 1–20 minutes at about 350° F., depending upon the desired use and the nature and amount of the added rubber when co-vulcanized with the chlorinated butyl rubber. Furthermore, although for most uses the optimum vulcanization conditions are from about 5–120 minutes at about 280°–350° F., the particular compounding desired will require a change in vulcanizing conditions as will the presence or absence of sulfur and vulcanization accelerators in addition to or in lieu of vulcanization in the presence of basic metal compounds such as bivalent metal oxides of the type of zinc oxide. For example, when the cure is in the presence of sulfur and an accelerator (e.g. tetra methyl thiuram disulfide, tellurium diethyl dithiocarbamate, etc.), the requisite curing time at the same temperature will be less than in the case of employing a zinc-oxide cure pre se. In the former instance the cure would be effective for many purposes at 270°–320° F. for about 5–60 minutes whereas in the latter instance a more desirable cure is at about 260°–340° F. at about 15 minutes to about 2 hours depending upon the desired use.

One particularly advantageous butyl rubber is produced with the preferred reactants being about 1–10 parts by weight of isoprene and about 99–90 parts by weight of isobutylene and the mixture of these reactants is cooled to a temperature within the range of about —70° to —170° C. and then polymerized by the addition thereto of a catalyst comprising a solution of an aluminum halide. For further specific details as to other processes for the production of butyl rubbers, reference may be had to U.S. Patents 2,356,128; 2,384,975; 2,399,672; 2,418,912; 2,607,764 and the literature.

The invention will be better understood from the following examples wherein reference will be made to the drawings. In the examples, unless otherwise indicated, the chlorination temperature is room temperature (25°

C.), the pressure is atmospheric and the time is 30 minutes.

EXAMPLE 1

The result of a number of runs are illustrated in Fig. 1 in which A, C and E are sulfur-cured halogenated butyl rubbers and B, D and F are zinc oxide-cured halogenated butyl rubbers. Also, A and B butyl rubbers contain 1.25 wt. percent chlorine whereas rubbers C and D contain 2.5 wt. percent bromine and rubbers E and F contain 1.25 wt. percent bromine.

Run #1

The butyl rubber employed in all instances in Figure 1 is a copolymer containing 97% isobutylene and 3% isoprene having a viscosity average molecular weight of 320,000. The reactants of isobutylene and isoprene are mixed in a ratio of about 94 parts by weight of isobutylene and about 6 parts by weight of isoprene and are dissolved in liquid methyl chloride. To this admixture is added a solution of aluminum chloride dissolved in liquid methyl chloride in sufficient quantities to correspond to about 0.5 part by weight of $AlCl_3$ per 100 parts by weight of reactants. The polymerization is then conducted at about $-100°$ F., the solvent stripped off, the catalyst killed by water-washing, and the rubbery polymer recovered therefrom. The polymer is then dissolved in liquid ethyl chloride to form a 20% solution containing 100 parts by weight of copolymer. The copolymer is then admixed with 2.5 parts by weight of chlorine dissolved in liquid ethyl chloride and stirred for 2 hours under conditions of diffused light while keeping the ethyl chloride in the liquid state. The unreacted chlorine is neutralized with a 20% water solution of sodium carbonate. The rubbery chlorinated copolymer is recovered by filtration, contains 1.25% by weight of chlorine and has a viscosity average molecular weight of 320,000.

Run #2

The above general procedure is then repeated by employing bromine dissolved in ethyl chloride; and, by varying the amounts of bromine between about 2-7 parts by weight of bromine in the ethyl chloride, per 100 parts by weight of the copolymer, two different portions of brominated butyl rubber are obtained; one portion containing 1.25 weight percent bromine and the other portion containing 2.5 weight percent bromine.

The above samples of chlorinated and brominated butyl rubbers are then divided into two additional samples and each is compounded by milling with 50 parts by weight of carbon black, 10 parts by weight zinc oxide per 100 parts by weight of the copolymer and were vulcanized for 20 minutes at 330° F. The vulcanizates obtained are designated as vulcanizates B, D, and F in Figure I. To the other portion of these copolymers is added 50 parts by weight carbon black, 10 parts by weight zinc oxide, 3 parts by weight sulfur, 2 parts of stearic acid as a mold release agent and 1.5 parts by weight of tellurium diethyl dithiocarbamate and was heated at 310° F. for 35 minutes to vulcanize the compositions. These vulcanizates are designated as vulcanizates A, C and E in Figure I.

At 300° F. the vulcanizates are then heat aged for 14 hours and tested at various intervals for tensile strength. The results, as shown in Figure I, demonstrate that, after 14 hours, the chlorinated butyl rubbers (A and B) withstand heat aging satisfactorily in that their tensile strength is only slightly altered (slightly lowered in the case of the sulfur-cured chlorinated butyl rubber (rubber A) and slightly raised in the case of the zinc oxide-cured chlorinated butyl rubber (rubber B). However, the brominated butyl rubber does not heat age satisfactorily and loses from about 800 to 1000 p.s.i. in tensile strength (as shown by the curves depicting butyl rubbers C to F) which for rubbers having an initial tensile strength of about 1370 p.s.i. and 2200 p.s.i. is a serious loss.

EXAMPLE 2

A polymer containing about 97% isobutylene and 3% isoprene as prepared in Example 1 and having a viscosity average molecular weight of 320,000 was dissolved in hexane to form a 10% solution. To this polymeric solution, 20 weight percent (based on the polymer) of liquid sulfuryl chloride was added as the chlorinating agent and the resulting chlorinated interpolymer was precipitated with acetone, collected, and redissolved in hexane three times and ultimately dried and analyzed and found to have a viscosity average molecular weight of 320,000 and to contain 1.4% chlorine based on the polymer. The composite was then divided into 2 portions as was a commercially obtainable butyl rubber containing 2.5-3.0 wt. percent bromine, and the following compositions were prepared:

| | Parts by Weight | | | |
|---|---|---|---|---|
| | Rubber A | Rubber B | Rubber C | Rubber D |
| Chlorinated Butyl Rubber | | | 100 | 100 |
| Brominated Butyl Rubber | 100 | 100 | | |
| Carbon Black | 50 | 50 | 50 | 50 |
| Zinc Oxide | 5 | 5 | 5 | 5 |
| Sulfur | | 1 | | 1 |
| Tellurium Diethyl Dithiocarbamate | | 1 | | 1 |
| Stearic Acid | 1 | 1 | 1 | 1 |

The results when cured at 287° F. for the times designated, were as follows:

| | Rubber A | Rubber B | Rubber C | Rubber D |
|---|---|---|---|---|
| Curing Time, Min | 120 | 60 | 120 | 60 |
| Tensile Strength, p.s.i | 1,530 | 2,420 | 1,710 | 2,335 |
| Mod. of Elast., at 300% elongation | 680 | 1,390 | 1,440 | 2,110 |

The above compositions, A, B, C, and D, were then heat-aged under more drastic conditions for 16 hours at 320° F. in a mold and the results were as follows:

| | Rubber A | Rubber B | Rubber C | Rubber D |
|---|---|---|---|---|
| Tensile Strength, p.s.i | 340 | 1,320 | 1,940 | 2,075 |
| Tensile Strength retained, % | 22.2 | 53.6 | 113 | 88.9 |

A comparison of the above shows the superiority of chlorinated butyl rubber in composition with zinc oxide and also when in composition with both zinc oxide, sulfur and a vulcanization accelerator as compared to brominated butyl rubber made up in identical compositions.

When these above compositions were vulcanized at their optimum curing time at 287° F., the chlorinated butyl rubbers C and D exemplified a higher modulus of elasticity at 300% elongation and comparable tensile strength. Also, when these same compositions were heat-aged for 16 hours at 320° F., the tensile strength of the brominated butyl rubbers A and B dropped to between 22.2-53.6% of their original tensile strength which is an extremely serious loss; whereas the chlorinated butyl rubbers C and D were not substantially affected in that the tensile strength was either raised or lowered only slightly; (i.e. a gain in tensile strength of 13% and a loss in tensile strength of 11.1%, respectively).

EXAMPLE 3

The identical procedure is followed as for Example 2 and the resulting butyl rubber containing 1.4% chlorine based on the polymer is compared to commercial brominated butyl rubber of the same composition containing 2.5–3.0% bromine by compounding the butyl rubbers as follows:

|  | Rubber E | Rubber F |
|---|---|---|
| Chlorinated Butyl Rubber | 100 |  |
| Brominated Butyl Rubber |  | 100 |
| Carbon Black (SRF) | 50 | 50 |
| Zinc Oxide | 10 | 10 |
| Sulfur | 1 | 1 |
| Tellurium Diethyl Dithiocarbamate | 1 | 1 |
| 4-methyl-2,6-ditertiary phenol [1] | 0.25 | 0.25 |

[1] Antioxidant.

The above butyl rubber compositions E and F are then cured for 60 minutes at 320° F. and have the following tensile strength:

Rubber E—2400 p.s.i.    Rubber F—2280 p.s.i.

The compositions are then aged in a tensile pad mold for 24 hours at 320° F. and the following tensile properties are obtained:

| Rubber | E | F |
|---|---|---|
| Tensile Strength, p.s.i. | 2,260 | 1,220 |
| Percent Retention of Tensile Strength | 85 | 68.5 |
| Modulus of Elasticity 300% Elongation | 1,620 | 780 |

A comparison of the above shows the superiority of chlorinated butyl rubber when heat aged as compared to brominated butyl rubber. The fact that an antioxidant (4-methyl-2,6-di-tertiary phenol) is added slightly improves the heat aging characteristics of the chlorinated butyl rubber but does not appreciably alter the poor heat aging characteristics of the brominated butyl rubber.

It is a further discovery of the present invention that when a non-polar solvent is employed with certain chlorinating agents, the amount of chlorine introduced into the polymer is much more easily controlled. This is particularly noticeable when non-polar solvents such as completely chlorinated hydrocarbons, aliphatic saturated hydrocarbons or petroleum streams containing saturated aliphatic hydrocarbons, aromatic hydrocarbons, etc., such as naphtha, n-heptane, hexane, cyclohexane, pentane, benzene, toluene, etc. are employed with sulfur-chlorides, especially sulfuryl chloride. For instance, sulfuryl chloride may be employed according to the above when carbon tetrachloride is the butyl rubber solvent where as when using such materials as unsymmetrical halogenated organic compounds such as alkyl chlorides, closely controlled conditions are required. For example, employing sulfuryl chloride with a non-polar solvent such as carbon tetrachloride, the amount of chlorinating agent added is not nearly as critical as when sulfuryl chloride with a polar solvent such as chloroform is used; and the resulting amount of chlorine in a chlorinated copolymer containing 97–97.5 wt. percent isobutylene and 2.5–3.0 wt. percent isoprene is maintained within the range of about 0.5–2.0 wt. percent although relatively large amounts of sulfuryl chloride in carbon tetrachloride are used. The above principle is graphically illustrated in Figure II which will be described in the following example.

EXAMPLE 4

In both instances of Figure II, only about 1.2–1.5 atoms of chlorine reacted with the copolymer per about 16 atoms of chlorine in the form of sulfuryl chloride present in the reaction mixture. The amount of sulfuryl chloride was then increased to about 1.5 times the amount of chlorine above mentioned without changing the combined chlorine content of the polymer appreciably. In Figure II, the reaction between the sulfuryl chloride and the butyl rubber was allowed to proceed at 25° C. for 90 hours (although the reaction was substantially complete in 10–15 minutes) in order to ascertain the fact that the excessive addition of sulfuryl chloride in a non-polar solvent over prolonged periods of time does not cause undesirably large amounts of chlorine to be introduced into the polymer molecule. The preparation of the chlorinated butyl rubbers as shown in Figure II, run A and run B were as follows:

Run A

Thirty grams of an interpolymer containing about 98.0% isobutylene and 2.0% isoprene having a viscosity average molecular weight of 330,000 were dissolved in 480 grams of carbon tetrachloride and treated for 2 hours at room temperature with 3 mls. of liquid sulfuryl chloride containing 10.5 wt. percent chlorine based on the interpolymer. The polymer was then precipitated from solution with acetone, filtered, redissolved in n-hexane, again precipitated with acetone, redissolved and filtered, etc., in order to purify the product. The rubbery polymeric composition was then dried and analyzed for chlorine content and found to contain 1.19% chlorine.

The rate of reaction of the chlorine with the interpolymer was as follows:

Reaction time (minutes): Percent chlorine in polymer
15 _____ 1.12
30 _____ 1.14
60 _____ 1.16
90 _____ 1.19

The polymer was then compounded as follows:

Parts by weight
Polymer _____ 100
Zinc oxide _____ 5
Carbon black _____ 40
Stearic acid _____ 2

Three portions of the above were cured as follows with the following results:

| Cure, min. at 300° F. | Tensile Strength (p.s.i.) | Modulus at 300% Elongation in p.s.i. | Elongation Percent |
|---|---|---|---|
| 12 | 1,260 | 610 | 510 |
| 40 | 2,000 | 980 | 470 |
| 80 | 2,180 | 1,020 | 460 |

The above data indicate that a satisfactory elongation is obtained when the rubber is cured for about 10–12 minutes or more but that the tensile strength of the rubber improved considerably when cured for 30–40 minutes or longer.

Run B

The same general procedure of Run A was repeated except that the interpolymer had a viscosity average molecular weight of 340,000 and contained 97.5% isobutylene and 2.5% isoprene. To a solution of the above interpolymer in 300 milliliters of carbon tetrachloride was added 5 milliliters of $SO_2Cl_2$ to give a resulting polymer composition containing 1.4% chlorine by weight based on the interpolymer after 15 minutes. The polymer was allowed to continue reaction for various periods of time at room temperature (25° C.) and was recovered by repeated precipitation with acetone and re-solution in n-hexane, re-precipitation etc., and was ultimately dried in an over under 28 inches of mercury vacuum at 70° C. and analyzed as follows:

Reaction time (min.): Percent chlorine in polymer
15 _____ 1.40
30 _____ 1.43
60 _____ 1.45
90 _____ 1.47

EXAMPLE 5

In preparing butyl rubbers (of isobutylene and isoprene) A, B and C appearing in Figure III, 30 grams of butyl rubbers having respectively (a) 1 mol percent unsaturation (98.79 weight percent isobutylene), (b) 1.7 mol percent unsaturation (97.94 weight percent isobutylene), and (c) 2.07 mol percent unsaturation (97.49 weight percent isobutylene) were dissolved in 300 milliliters of carbon tetrachloride (a non-polar solvent). Ten milliliters of liquid $SO_2Cl_2$ containing 28 weight percent chlorine based on weight of the polymer was added, which addition constitutes a very large excess. The reaction was conducted for 30 minutes at room temperature (25° C.) and the resulting chlorinated butyl rubbers were recovered according to the procedure of Example 4, Run 2.

By plotting, in Figure III, the iodine number of the original polymer against the percent of chlorine in the final polymer, the line of closest agreement corresponds to about 0.71 weight percent chlorine in the finished polymer per mol percent unsaturation (iodine number times 0.147) of the original polymer. This corresponds to about 1.12 atoms of chlorine per molecule of multi-olefin in the polymer after complete reaction. Thus it is shown that regardless of the iodine number of the original polymer, by employing sulfuryl chloride in a non-polar solvent as the chlorinating medium, a ratio is maintained of approximately one atom of chlorine (i.e., 1.12 atoms) combined with the polymer for each molecule of multi-olefin therein, which ratio is very desirable for the purposes of the present invention.

EXAMPLE 6

A butyl-type rubbery copolymer containing 96.84 wt. percent of isobutylene and 3.16 wt. percent of isoprene and having a viscosity average molecular weight of 320,000 was dissolved in chloroform (a polar solvent) to form a 10 wt. percent solution. To this polymeric solution, various amounts of liquid sulfuryl chloride were added as hereinafter indicated in Table I and as shown in Figure IV. In all instances, the reaction between the copolymer and sulfuryl chloride was at 25° C. for 24 hours and the resulting chlorinated interpolymer was precipitated from solution with acetone, collected, redissolved in hexane, etc., for three successive times and ultimately dried and found to contain the following amounts of combined chlorine and molecular weights:

TABLE I

| Run No. | Percent Cl Added as $SO_2Cl_2$ | Percent Cl in the Polymer | Viscosity, Average Mol. Wt. | Atoms of Cl per Molecule of Multi-olefin | Staudinger Molecular Weight |
| --- | --- | --- | --- | --- | --- |
| 1 | 0 | 0 | 330,000 | 0 | 36,000 |
| 2 | 2.70 | 1.05 | 330,000 | 0.66 | 36,000 |
| 3 | 2.94 | 1.41 | 330,000 | 0.89 | 36,000 |
| 4 | 5.87 | 2.00 | 255,000 | 1.26 | 30,800 |
| 5 | 8.80 | 2.42 | 79,000 | 1.52 | 14,200 |

Referring now to Figure IV, which comprises a graph including the data from Table I, it is shown that when sulfuryl chloride is employed to chlorinate butyl rubber in a "polar" solvent (chloroform), the chlorination must be carefully controlled to prevent degradation of the molecular weight of the rubber. For example, from the graph for the above tested butyl rubber (containing 96.84 weight percent isobutylene and 3.16 weight percent isoprene), it is shown that when more than about 1.6–1.8 weight percent of chlorine was introduced into the polymer the molecular weight thereof became rapidly and drastically lowered. Referring back to Table I, it will be noted that about 1.4 percent chlorine represents about 0.89 atom of chlorine per molecule of multi-olefin in the polymer, whereas 1.6 percent chlorine represents about 1 atom of chlorine per molecule of multi-olefin in the rubbery polymer. Thus, it has been demonstrated that approximately the maximum amount of chlorine permissible, whereby to obtain a chlorinated butyl rubber without degrading the molecular weight of the polymer, is about one atom of chlorine per molecule of multi-olefin in the polymer, which corresponds to a ratio of about one atom of chlorine per double bond in said polymer.

Employing the formula given above for approximately the preferred maximum permissible chlorine content in the polymer, the maximum weight percent of chlorine equals "X" wherein:

$$X = \frac{35.46L}{(100-L)M_1 + L(M_2 + 35.46)} \times 100$$

wherein: $M_1$=molecular weight of isobutylene; $M_2$=molecular weight of isoprene and $$L = \text{mol percent isoprene} = 3.16\frac{M_1}{M_2} = 3.16\frac{56.1}{68.1} = 2.60$$

therefore:

$$X = \frac{35.46(2.6)}{(100-2.6)56.1 + 2.6(68.1+35.46)} \times 100$$

and:

$X = 1.61$ weight percent combined chlorine

EXAMPLE 7

The same general procedure of Example 2, Run 1, was repeated, except that before the addition of the sulfuryl chloride, 0.30 gram of benzoyl peroxide dissolved in 40 ml. of benzene was added to the polymer solution. The polymer product obtained was substantially the same as the product of Example 2, having a chlorine content of 1.11%, and was then compounded as follows:

| | Weight percent |
| --- | --- |
| Polymer | 100 |
| Zinc oxide | 5 |
| Carbon black | 40 |
| Stearic acid | 2 |

The above composition was then divided into three portions and cured as below indicated, with the following results:

| Cure, min. at 300° F. | Tensile Strength (p.s.i.) | Modulus at 300% Elongation (p.s.i.) | Elongation (percent) |
| --- | --- | --- | --- |
| 14 | 1,700 | 670 | 520 |
| 40 | 2,000 | 960 | 470 |
| 80 | 2,230 | 1,160 | 450 |

EXAMPLE 8

A solution in carbon tetrachloride of a copolymer having a viscosity average molecular weight of 340,000 and containing 97.5% isobutylene and 2.5% isoprene was prepared to contain 100 grams of polymer per liter of solution. To this solution, at room temperature under conditions of diffused light, 1.6 weight percent of chlorine was added in a solution of carbon tetrachloride having a concentration of 0.025 gram of chlorine per milliliter of solution. The chlorine was added in four equal increments. The first increment added imparted a yellowish shade of color to the polymer solution which bleached out within a few minutes. Approximately 1 mole of hydrogen chloride was evolved per mole of chlorine added and the hydrogen chloride evolution began almost instantly. The last increment of chlorine added imparted a yellowish-green color to the polymer solution which likewise bleached out. The composite was allowed to stand 2 hours at room temperature in diffused light and the polymer was recovered from this solution by precipitation with methyl alcohol followed by drying in a vacuum oven for 12 hours at 50° C. and was found to contain 0.8 weight percent chlorine. The polymer was then compounded with 40 parts by weight carbon black, 2 parts by weight stearic acid, and 5 parts by weight zinc oxide per 100 parts by weight of the copolymer, was heated for 40 minutes at 300° F., was found to be completely vulcanized and had the following physical characteristics:

Tensile strength, p.s.i. _____ 2100
Elongation, percent _____ 430
Modulus at 300% elongation, p.s.i. _____ 1350

EXAMPLE 9

Run A—A

The procedure of Example 8 was repeated except that 2.41% of chlorine was added to the copolymer containing 97.5% isobutylene and 2.5% isoprene at once rather than incrementally, and the resulting copolymer had a chlorine content of about 1.2% by weight. The polymer was also admixed with the same quantities of carbon black, stearic acid and zinc oxide, and vulcanized under the same conditions as in Example 4 and the vulcanizate was found to have substantially the same physical properties as the vulcanizate of Example 8.

Run B—B

The same general procedure was employed as in Run A—A, except that 4.8 weight percent of chlorine was added and the resulting copolymer had a chlorine content of about 2.4 weight percent. The rubber was found to have decreased in viscosity excessively and have become so excessively degraded as to be unusable as a rubber. From the above runs in Example 9, it was determined that the atoms of combined chlorine should not appreciably exceed the number of molecules of added conjugated diolefin (such as isoprene). Since, in the above runs of Example 9, 2.5 weight percent of isoprene was employed, the maximum amount of chlorine permissible would be roughly about 1.2% and it is for this reason that run A—A employing 1.2% by weight of combined chlorine was satisfactory, whereas run B—B employing 2.4% by weight combined chlorine was unsatisfactory.

Applying the above formula for more closely calculating approximately the maximum amount of combined chlorine permissible, said amount expressed as weight percent of combined chlorine in the polymer equals "X" wherein:

$$X = \frac{35.46L}{(100-L)M_1 + L(M_2+35.46)} \times 100$$

wherein: $M_1$=M.W. of isobutylene, $M_2$=M.W. of isoprene and
$L$=mol. percent isoprene $$= 2.5 \times \frac{M_1}{M_2} = 2.5 \frac{56.1}{68.1} = 2.06 \text{ mole percent}$$

therefore:

$$X = \frac{35.46(2.06)}{(100-2.06)56.1 + 2.06(68.1+35.46)} \times 100$$

and:

$X = 1.28$ weight percent chlorine

It has also been found that for every molecule of molecular chlorine consumed, approximately 1 atom of chlorine combined with hydrogen to evolve as hydrogen chloride, and the other atom apparently replaced a hydrogen atom in the polymer molecule. Therefore, in order to obtain a given percent of chlorine in the polymer, approximately double this amount of chlorine must be added.

The following examples are also illustrative of the foregoing:

EXAMPLE 10

A solution in liquid ethyl chloride of a copolymer containing about 92 parts by weight isobutylene and 8.0 parts by weight of isoprene having a viscosity average molecular weight of 240,000 is prepared in a concentration of 100 grams of polymer per liter of solution. To this solution at room temperature under conditions of diffused light, approximately 6.0 grams of chlorine as a solution of 0.03% grams chlorine per milliliter of chloroform is added and the mixture is allowed to stand for one hour at room temperature. The polymer is recovered from the solution by precipitation with methyl alcohol, followed by drying in an oven overnight at 60° C. When 100 parts by weight of the resulting polymer is compounded with 40 parts by weight of carbon black, 2 parts by weight of stearic acid and 5 parts by weight of zinc oxide and heated for one hour at 290° F., it is not degraded in viscosity and withstands heat aging at 300° F. for twenty hours satisfactorily. The amount of combined chlorine in the chlorinated butyl rubber is about 3.00 weight percent.

Applying the above formula for calculating approximately the maximum amount of combined chlorine permissible, said amount expressed as weight percent of combined chlorine in the polymer equals "X" wherein:

$$X = \frac{35.46L}{(100-L)M_1 + L(M_2+35.46)} \times 100$$

wherein: $M_1$=M.W. of isobutylene, $M_2$=M.W. of isoprene and $$L = \text{mole percent isoprene} = 8.0 \times \frac{M_1}{M_2} = 8.0 \frac{56.1}{68.1} = 6.59$$

therefore:

$$X = \frac{35.46(6.59)}{(100-6.59)56.1 + 6.59(68.1+35.46)} \times 100$$

and:

$X = 3.96$ weight percent chlorine

EXAMPLE 11

The same general procedure as for Example 10 is repeated by employing instead of the isobutylene-isoprene copolymer, the following:

(1) Copolymer containing about 95% isobutylene and 5% isoprene with 2.5% combined chlorine.
(2) Copolymer containing about 94% isobutylene and 6% cyclopentadiene with 2% combined chlorine.
(3) Copolymer containing about 92% isobutylene and 8% myrcene with 1.6% combined chlorine.
(4) Copolymer containing about 95% 2-methyl butene-1, 5% isoprene, with 1.3% combined chlorine.
(5) Copolymer containing about 96% 2-methyl butene-1, 4% butadiene-1,3, with 1.7% combined chlorine.
(6) Copolymer containing about 92% isobutylene, 8% butadiene-1,3, with 2.4% combined chlorine.
(7) Copolymer containing about 98% isobutylene and 2% 1-vinyl cyclohexene-1,3 with 0.5% combined chlorine.
(8) Copolymer containing about 85% isobutylene and 15% isoprene with 6% combined chlorine.

In each of the above cases, the chlorinated butyl rubber is satisfactory in curing ability, adhesion to natural rubber, compatibility with natural rubber and GR–S rubber, the heat aging characteristics are also satisfactory. The molecular weight of the copolymer is also not substantially degraded. However, in the cases of the copolymers containing butadiene and cyclopentadiene there is a tendency towards premature curing.

Obviously, other examples of copolymers including tripolymers of isobutylene, dimethyl fulvene and isoprene, or isobutylene, styrene and isoprene, etc. may likewise be employed within the purview of the present invention. The addition of carbon black as the particular filler prior to vulcanization is an optional embodiment but is preferred unless the butyl rubber is to be other than a black rubber, and the use of stearic acid as a mold release agent in amounts of about 1–5% is likewise an optional embodiment. The use of mercaptobenzothiazole in amounts of about 0.3–1.5 weight percent is likewise optional. Also, the use of combinations of zinc oxide and sulfur as the vulcanizing medium is intended to be included within the purview of the present invention.

EXAMPLE 12

The following compositions are compounded and vulcanized with 2 weight percent sulfur and used in the fabrication of automobile tires.

(1) Copolymer containing 97.5% isobutylene and 2.5% isoprene;

(2) Same copolymer as (1) except that it contains 1.2% combined chlorine;

(3) A mixture of 70% of (1) and 30% natural rubber, and (4) A mixture of 70% of (2) and 30% natural rubber.

| Composition | Optimum cure at 300° F. in min. | Percent Elongation | Tensile Strength, p.s.i. |
|---|---|---|---|
| 1 | 60 | 730 | 2,210 |
| 2 | 7 | 700 | 2,480 |
| 3 | 60 | 325 | 650 |
| 4 | 12 | 575 | 2,350 |

From a comparison of the above, it is noted that composition 4 which contains both natural rubber and chlorinated butyl rubber vulcanizes rapidly, yielding an elastic product having considerable tensile strength (2350 p.s.i.), whereas composition 3 which comprises an admixture of natural rubber with unchlorinated butyl rubber, upon vulcanization, exemplifies a very poor tensile strength (650 p.s.i.).

In mixed rubber composites, the chlorinated butyl rubber of the present invention and natural rubber or other synthetic rubbers may be present in any desired ratio, normally corresponding to about 10–90% of either rubber, although more or less may be used. Conventional butyl rubber will not co-vulcanize with natural rubber and other synthetic rubbers satisfactorily. This has been one of the principal reasons preventing more extensive use of butyl rubber. The chlorinated butyl rubber copolymers of the present invention however, which are substantially completely free of this disadvantage, are therefore of increased commercial merit.

The present invention is also applicable for the production of rubber tires with black or white sidewalls and other colored chlorinated butyl rubber compositions. The use of curing agents, accelerators, antioxidants, activators, plasticizers, and/or added metal oxides, such as zinc oxide, titanium dioxide, lead oxide, magnesium oxide, etc., is also sometimes advantageous. The vulcanizable compositions may also comprise about 0–30 parts by weight of a plasticizer oil and/or about 0–2 parts or more by weight of conventional accelerators, such as tetra alkyl thiuram sulfides, mercaptobenzothiazoles, benzothiazyl disulfide and/or about 0–5 parts by weight or more of quinoid-type curing agents such as p-dinitroso benzene, quinone dioximes or esters thereof, and/or together with suitable activating agents for the above general type of respective cures, such as certain multivalent metal oxides, especially lead oxides, and/or such accelerators as above-mentioned or their equivalents. The general characteristics of the plasticizer oil may be as follows:

| | Preferred | Minimum | Maximum |
|---|---|---|---|
| API° | 15–28 | 10 | 35 |
| Flash Point (Open Cup Method), ° F | 525 | 300 | 700 |
| Pour Point, ° F | 15–30 | 10 | 60 |
| SSU at 100° F | 100–12,000″ | 50″ | 20,000″ |

Other plasticizers suitable in special instances are tars, waxes, resins, esters, high boiling hydrocarbon oils, organic phosphates, etc.

Examples of antioxidants are phenyl-beta-naphthylamine or certain alkylated aromatic hydrocarbons or alkylated heterocyclics which may be employed in amounts of about 0.1% to about 2% by weight depending upon the particular antioxidant. For example, alkylated bis-phenols have been found particularly advantageous as have alkylated aminophenols and alkylated diphenylamines. The alkyl groups generally do not contain more than about 16 carbon atoms.

EXAMPLE 13

A general range of ingredients and a specific composition for a chlorinated white butyl rubber of a copolymer containing 97% isobutylene and 3% isoprene may be as follows:

| | General Range, parts by weight | Specific Composition, parts by weight |
|---|---|---|
| Chlorinated butyl rubber (containing 1.3% chlorine) | 100 | 100 |
| Titanium dioxide | 10–150 | 40 |
| Zinc Oxide | 5–100 | 30 |
| Sulfur | 0–4 | 2 |
| 2-mercaptobenzothiazole | 0–2 | 1 |
| Ultra-marine blue | 0–1 | 0.3 |
| Diphenyl guanidine | 0–1 | 0.3 |
| Stearic acid | 0–2 | 1.5 |

The above may optionally be admixed with various amounts of other rubbers, such as with GRS rubber and/or natural rubber.

The following rubbers may be used instead of natural rubber and advantageously combined with the chlorinated butyl rubber of the present invention or with chlorinated butyl rubber and natural rubber: copolymers of such materials as butadiene, isoprene or chloroprene with each other or with olefinic compounds such as styrene, acrylonitrile, vinylidene chloride, acrylic acid, vinyl pyridine, vinyl chloride, acrylic esters, methacrylic acids and esters, etc., as well as such homo-polymers as polyisobutylene, polybutadiene, polychloroprene, polyisoprene, and the like, or copolymers of the monomeric form of these materials with each other or any of the above, mixtures thereof, or their equivalents.

EXAMPLE 14

Another chlorinated copolymer containing 99% isobutylene and 1% isoprene is compounded as follows:

| | General Range, parts by weight | This Example, parts by weight |
|---|---|---|
| Chlorinated butyl rubber (0.5% combined chlorine) | 100 | 100 |
| Zinc Oxide | 5–30 | 5 |
| Carbon Black | 10–100 | 50 |
| Sulfur | 0.5–5 | 2 |
| Tetramethyl thiuram disulfide | 0–2 | 0.75 |
| Stearic acid | 0–10 | 1.5 |
| Mineral filler | 0–100 | 0 |

The above composition is then vulcanized for 20 minutes at 300° F. and the resulting vulcanizate has a tensile strength of 3,050 pounds per square inch and an elongation of 600%.

EXAMPLE 15

Seventy-five grams of a copolymer containing 98.3 weight percent isobutylene and 1.7 weight percent isoprene were dissolved in 750 ml. of carbon tetrachloride and 12.5 ml. of $SO_2Cl_2$ were added thereto. The reaction proceeded at room temperature for two hours, the chlorinated butyl rubber was recovered according to the procedure of Example 4, Run 2, and was analyzed and found to contain:

| Percent Cl | Percent S |
|---|---|
| 1.12 | 0.09 |

The above results indicate that the reaction is one predominately of chlorination rather than of sulfochlorination.

EXAMPLE 16

The same general process of Example 1, Run 1, was repeated employing the same copolymer containing 97% isobutylene and 3% isoprene. The copolymer was found to contain 1.4 weight percent chlorine after 80 minutes; it was compounded as follows:

|  | Parts by Weight | |
|---|---|---|
|  | Composition A | Composition B |
| Chlorinated butyl rubber | 100 | 80 |
| Natural rubber |  | 20 |
| Carbon Black (EPC Black) | 50 | 50 |
| Zinc Oxide | 5 | 5 |
| Stearic Acid | 1 | 1 |
| Sulfur |  | 2 |
| Mercaptobenzothiazole |  | 0.5 |
| Tetramethyl thiuram disulfide |  | 0.2 |

Test results were as follows:

| Composition | Cure Time at 287° F. (minutes) | Tensile Strength (p.s.i.) | Percent Elongation |
|---|---|---|---|
| (A) | 15 | 1,280 | 400 |
| (A) | 30 | 1,650 | 340 |
| (A) | 60 | 1,820 | 300 |
| (A) | 120 | 2,060 | 275 |
| (B) | 15 | 750 | 370 |
| (B) | 30 | 1,340 | 300 |
| (B) | 60 | 1,540 | 295 |
| (B) | 120 | 2,100 | 275 |

The above data show that the chlorinated butyl rubber of the invention cures effectively with zinc oxide although sulfur may also be included, as may other conventional butyl rubber vulcanization accelerators known in the art. The data also show that good vulcanizates may be obtained from mixtures of chlorinated butyl rubber with natural rubber, the tensile strength and elongation being almost the same when either chlorinated butyl rubber per se is vulcanized or an admixture of chlorinated butyl rubber and natural rubber is vulcanized.

One particularly advantageous use for the chlorinated butyl rubber of the present invention is in pneumatic tires of either the inner tube containing variety or in a tubeless type tire.

Figure V depicts a pneumatic tubeless tire which comprises a hollow toroidal type member which is substantially U-shaped in cross-section by virtue of an open portion which extends around the inner periphery of the member. In other words, the tire is of a tubular type structure which has a cross-section in the form of an open-bellied body with spaced terminal portions to define a member generally resembling a horseshoe. The terminal portions constitute the bead portions 11—11 of the tire inside of which are a plurality of bead wires adhesively imbedded and molded in a rubber. The outer surface of the bead portion is advantageously formed into an air sealing means, such as a plurality of ribs (not shown) to aid in adhesion to rim 12 when the tire is inflated.

The outer surface of the tire also includes tread area 13 and side walls 14. The open portion of the horseshoe shaped tire faces that portion of the inner circumference of the tire which is adjacent the said area 13 of the tire.

The remaining construction of the tire may vary according to conventional fabrication, but in general the tire is a multi-layered type of structure with an outer layer as above-mentioned. The layer next adjacent the outer layer generally comprises a carcass 15 which includes a rubber which has incorporated therein a fabric composed of a plurality of cotton, rayon or nylon cords, etc. The tire also includes an inner lining advantageously made from rubber, e.g. chlorinated butyl rubber, which must be substantially impermeable to air. For example, the lining may advantageously comprise natural rubber, neoprene-type rubber, a rubbery copolymer, chlorinated copolymer or mixtures of any of the above wherein the copolymer comprises the reaction product of about 20–99.5 weight percent of a $C_4$–$C_7$ isoolefin, such as isobutylene, and about 0.5–80 weight percent of a $C_4$–$C_{14}$ multi-olefin, such as isoprene which has been at least partially vulcanized. The above multi-layers, at least three in number, are conventionally bonded or otherwise adhered together, for example, by cementing and/or especially by vulcanization, etc., to form a tire of a unitary structure.

The chlorinated butyl rubber composition of the present invention may be employed generally throughout the tire and may be used alone or in admixture with natural rubber or certain synthetic rubbers to include chloroprene rubber, polyisoprene, butadiene or isoprene vinyl pyridine copolymers, and particularly GRS rubber, etc. However, for the inner lining of the tire, ordinary butyl rubber, chlorinated butyl rubber, natural rubber or mixtures thereof is preferred. Also, whereas the inner lining may comprise chlorinated butyl rubber or ordinary butyl rubber or mixtures thereof, the other layers of the tire, such as the intermediate carcass layer and/or the outer layer (including the tread area, the sidewall and the outer bead portions, etc.), may comprise chlorinated butyl rubber and/or other conventionally employed rubbers, such as natural rubber and synthetic rubbers and mixtures thereof (and reclaimed mixtures thereof) especially to include GRS rubber and/or natural rubber.

A tubeless tire may comprise a casing of an outer layer including the tread, sidewall, outer bead portions, etc., of vulcanized chlorinated butyl rubber, natural rubber, or GRS rubber or any mixtures or reclaimed mixtures of these rubbers which have been covulcanized. It also preferably comprises an intermediate layer or carcass of the above rubbers or combinations thereof, especially to include compositions containing chlorinated butyl rubber, alone or in admixture with ordinary butyl rubber, natural rubber, GR–S rubber or combinations thereof. The tire also comprises an inner layer which is preferably chlorinated butyl rubber but may be either ordinary butyl rubber alone, chlorinated butyl rubber alone, or an admixture of chlorinated butyl rubber and ordinary butyl rubber, which has been at least patrially vulcanized by heating for about 3–60 minutes or more at about 100–350° F. or higher with about 0.2–10.0 weight percent sulfur on a basis of the weight of the total rubber or rubbers as hereinbefore-mentioned or which has been cured with any of the heretofore disclosed curing compositions, especially to include curing compositions comprising or consisting essentially of certain bivalent metal oxides, such as lead oxide or preferably zinc oxide with or without added sulfur.

While there are above described a number of specific embodiments of the present invention, it is obviously possible to produce other embodiments and various equivalent modifications and variations thereof without departing from the spirit of the invention or the scope of the appended claims.

What is claimed is:

1. A composition comprising a substituted-chlorine-containing isoolefin-multiolefin butyl rubber copolymer, the chlorine combined in said copolymer being present in an amount of at least about 0.5 weight percent based on copolymer but not more than about 1 atom of combined chlorine per double bond in the copolymer, substantially all of said chlorine combined in the copolymer being present as substituted-chlorine, wherein the combined chlorine has replaced a hydrogen atom originally present in said copolymer.

2. A composition according to claim 1 in which the isoolefin-multiolefin butyl rubber copolymer comprises a copolymer of about 85 to 99.5 weight percent of a $C_4$ to $C_7$ isoolefin and about 0.5 to 15 weight percent of a $C_4$ to $C_{14}$ multiolefin.

3. A composition according to claim 1 containing, in addition to the chlorine-containing copolymer, a highly unsaturated rubber selected from the class consisting of natural rubber, rubbery diene-styrene copolymers and mixtures thereof.

4. A rubber tire having a tread area, sidewall areas, a carcass area and an interior air-holding area, said tire containing therein the composition of claim 1.

5. In a process for manufacturing a tubeless tire including a carcass member, the improvement which comprises vulcanizing to said carcass member an air-holding layer disposed interiorly thereof, said layer comprising the composition of claim 1.

6. A vulcanizable composition according to claim 1 comprising 100 parts by weight of the chlorine-containing copolymer compounded with about 5 to 50 parts by weight of zinc oxide, about 0.5 to 5 parts by weight of sulfur and about 0.3 to 5 parts by weight of an accelerator.

7. A composition according to claim 6 which has been vulcanized by heating at a temperature level of between about 250° and 450° F. for about 5 minutes to 5 hours.

8. A composition comprising a substituted-chlorine-containing rubbery isoolefin-multiolefin copolymer, said copolymer containing about 85 to 99.5 weight percent of a $C_4$ to $C_7$ isoolefin and about 0.5 to 15.0 weight percent of a $C_4$ to $C_{14}$ multiolefin, the chlorine combined in said copolymer being present in an amount of at least about 0.5 weight percent based on copolymer but not more than about "X" weight percent combined chlorine wherein "X" equals:

$$\frac{35.46L}{(100-L)M_1 + L(M_2+35.46)} \times 100$$

and $L$=mole percent of the multiolefin in the polymer
$M_1$=molecular weight of the isoolefin
$M_2$=molecular weight of the multiolefin, and
35.46=atomic weight of chlorine, substantially all of said chlorine combined in the copolymer being present as substituted-chlorine, wherein the combined chlorine has replaced a hydrogen atom originally present in said copolymer.

9. A composition according to claim 8 in which the isoolefin is isobutylene and the multiolefin is isoprene.

10. A composition according to claim 8 containing, in addition to the chlorine-containing copolymer formed, a vulcanizable highly unsaturated rubber co-vulcanized therewith.

11. A composition according to claim 8 in which the chlorine-containing copolymer has a Staudinger molecular weight of between about 20,000 and 100,000.

12. A composition according to claim 8 in which the copolymer contains about 95 to 99.5 weight percent of isobutylene as the isoolefin and about 0.5 to 5.0 weight percent of the multiolefin, said multiolefin containing about 4 to 6 carbon atoms.

13. A vulcanizable composition according to claim 8 in which 100 parts by weight of the chlorine-containing copolymer has been compounded with about 5 to 100 parts by weight of zinc oxide.

14. A process for producing chlorine-containing isoolefin-multiolefin butyl rubber copolymers which comprises contacting an unchlorinated butyl rubber copolymer with a chlorinating agent at a temperature level of between about 20° and 100° C. until there is combined in the copolymer at least 0.5 weight percent chlorine but not more than about 1 atom of combined chlorine per double bond in the copolymer.

15. A process according to claim 14 wherein the butyl rubber comprises a copolymer containing about 85 to 99.5 weight percent of a $C_4$ to $C_7$ isoolefin and about 0.5 to 15.0 weight percent of a $C_4$ to $C_6$ conjugated diolefin, the chlorination being effected by a chlorinating agent selected from the group consisting of gaseous chlorine, liquid sulfuryl chloride and mixtures thereof, the amount of resulting chlorine combined with the butyl rubber copolymer being at least 0.8 weight percent based on copolymer, but not more than about "X" weight percent combined chlorine wherein "X" equals:

$$\frac{35.46L}{(100-L)M_1 + L(M_2+35.46)} \times 100$$

and:

$L$=mole percent of the diolefin in the copolymer
$M_1$=molecular weight of the isoolefin
$M_2$=molecular weight of the diolefin, and
35.46=atomic weight of chlorine.

16. A process according to claim 14 in which the chlorinating agent comprises gaseous chlorine.

17. A process according to claim 14 in which the chlorinating agent comprises liquid sulfuryl chloride.

18. A process according to claim 14 in which the chlorination process is performed in the substantial absence of polar solvents.

19. A process according to claim 14 in which the chlorination is effected substantially at room temperature.

20. A process according to claim 14 in which the butyl rubber copolymer is dissolved in a solvent prior to chlorination.

21. A process of vulcanizing a chlorinated isobutylene-isoprene butyl rubber copolymer as defined in claim 1, which comprises compounding the chlorinated copolymer with about 10 to 100 parts by weight of a filler, about 5 to 50 parts by weight of a bivalent basic metal compound curative, and vulcanizing the resulting composite at about 250° to 450° F. for between about 5 and 120 minutes.

22. A vulcanized rubbery composition comprising a substituted-chlorine-containing isobutylene-isoprene butyl rubber copolymer, the chlorine combined in said copolymer being present in an amount of at least about 0.5 weight percent based on copolymer but not more than about 1 atom of combined chlorine per double bond in the copolymer, substantially all of said chlorine combined in the copolymer being present as substituted-chlorine, whereby each combined chlorine atom has replaced a hydrogen atom originally present in said copolymer, 100 parts by weight of said chlorine-containing copolymer having been vulcanized in the presence of about 5 to 50 parts by weight of a basic metal compound at about 280° to 350° F. for from about 5 minutes to about 2 hours.

23. A process for producing chlorine-containing isoolefin-multiolefin butyl rubber copolymers which comprises contacting an unchlorinated butyl rubber copolymer with a chlorinating agent at a temperature level of between about 20° and 100° C. until there is combined in the copolymer at least 0.5 weight percent chlorine but not more than about 1 atom of combined chlorine per double bond in the copolymer, substantially all of said chlorine combined in the copolymer being present as substituted chlorine, said combined chlorine having replaced a hydrogen atom originally present in said copolymer.

24. A process for producing chlorine-containing isoolefin-multiolefin butyl rubber copolymers which comprises contacting an unchlorinated butyl rubber copolymer with a chlorinating agent selected from the group consisting of gaseous chlorine, liquid sulfuryl chloride and mixtures thereof, at a temperature level of between about 20° and 100° C. until there is combined in the copolymer at least 0.5 weight percent chlorine but not more than about 1 atom of combined chlorine per double bond in the copolymer.

References Cited in the file of this patent

UNITED STATES PATENTS

| | | |
|---|---|---|
| 2,292,737 | Blomer et al. | Aug. 11, 1942 |
| 2,441,945 | Frolich et al. | May 25, 1948 |
| 2,467,322 | Lightbown et al. | Apr. 12, 1949 |
| 2,581,927 | Briant | Jan. 8, 1952 |
| 2,587,470 | Herzegh | Feb. 26, 1952 |
| 2,631,984 | Crawford et al. | Mar. 17, 1953 |
| 2,698,041 | Morrissey et al. | Dec. 28, 1954 |
| 2,732,354 | Morrissey et al. | Jan. 24, 1956 |
| 2,804,448 | Hallenbeck | Aug. 27, 1957 |